United States Patent
Nagaya et al.

(10) Patent No.: US 6,220,414 B1
(45) Date of Patent: Apr. 24, 2001

(54) ONE-WAY CLUTCH

(75) Inventors: Shuichi Nagaya; Hirofumi Miyata; Shinichiro Nishikawa, all of Hyogo; Masakazu Domoto; Masahiko Satoda, both of Shizuoka, all of (JP)

(73) Assignees: Bando Chemical Industries, Ltd., Hyogo; NTN Corporation, Osaka, both of (JP)

( * ) Notice: Subject to any disclaimer, the term of this patent is extended or adjusted under 35 U.S.C. 154(b) by 0 days.

(21) Appl. No.: 09/422,082

(22) Filed: Oct. 21, 1999

(30) Foreign Application Priority Data

Oct. 23, 1998 (JP) .................................. 10-302770
Oct. 23, 1998 (JP) .................................. 10-302774

(51) Int. Cl.$^7$ .................................................... F16D 41/07
(52) U.S. Cl. ........................................ 192/45.1; 192/41 A
(58) Field of Search ............................ 192/45.1, 41 A; 474/74

(56) References Cited

U.S. PATENT DOCUMENTS

| | | | | |
|---|---|---|---|---|
| 3,651,908 | * | 3/1972 | Oldfield ............................... | 192/45.1 |
| 3,997,041 | * | 12/1976 | Judd et al. ........................... | 192/41 A |
| 4,347,920 | * | 9/1982 | Bordes ................................ | 192/41 A |
| 4,725,259 | * | 2/1988 | Miyata ............................... | 474/74 X |
| 4,880,093 | * | 11/1989 | Message .............................. | 192/45.1 |
| 5,638,931 | * | 6/1997 | Kerr ................................... | 192/45 |
| 5,676,225 | * | 10/1997 | Miyata .......................... | 192/45.1 X |
| 5,765,670 | * | 6/1998 | Fujiwara et al. ..................... | 192/45.1 |

FOREIGN PATENT DOCUMENTS 61-228153  10/1986  (JP) .

\* cited by examiner

*Primary Examiner*—Rodney H. Bonck
(74) *Attorney, Agent, or Firm*—Nixon Peabody LLP; Thomas W. Cole

(57) ABSTRACT

A pulley with a built-in one-way clutch, the type of which has sprags tilting in a direction to wedge between inner and outer rings while being guided on respective riding lands of a cage by pressing of respective leaf springs, is mounted on an alternator shaft of an alternator to which torque of a crank shaft of a vehicle engine rotating together with slight variations in angular velocity is transmitted through a power transmission belt. In the mounting, a tilting force acting on a contact point at which each sprag contacts the corresponding riding land to tilt the sprag in the wedging direction is set larger than a frictional force between the sprag and the riding land acting on the contact point. According to this setting, the sprag can be tilted in the wedging direction regardless of the frictional force between the sprag and the riding land, thereby eliminating a locking failure within the high engine speed range.

4 Claims, 5 Drawing Sheets

ONE-WAY CLUTCH

FIELD OF THE INVENTION

This invention relates to a one-way clutch disposed, for example, in a torque transmission path for transmitting torque of a crank shaft of a vehicle engine rotating together with slight variations in angular velocity to an input shaft of auxiliary equipment (an auxiliary equipment shaft) through a power transmission belt, and particularly relates to measures for preventing a locking failure of the clutch due to high-frequency slight variations in angular velocity of the crank shaft or the like and measures for improving the ability of sprags to follow increase in angular velocity of the crank shaft or the like.

DESCRIPTION OF THE PRIOR ART

For example, as disclosed in Japanese Patent Application Laid-Open Gazette No. 61-228153, there is know a technique for reducing a load of a power transmission belt by disposing a one-way clutch in a torque transmission path for transmitting torque of a crank shaft of a vehicle engine to an auxiliary equipment shaft through the power transmission belt to absorb slight variations in angular velocity of torque, resulting from an explosion stroke of the engine, in the one-way clutch. In particular, if the auxiliary equipment is an alternator, its rotor has large inertial torque and therefore the effect of reducing a belt load is significant.

In this case, high-frequency slight variations in angular velocity of the crank shaft within the high engine speed range (e.g., at 5000 rpm) fall within a range to be sufficiently absorbable by elasticity of the power transmission belt, since the amplitude of variations is small. Therefore, the power transmission belt takes a light load. On the contrary, low-frequency slight variations in angular velocity of the crank shaft within the low engine speed range have a large amplitude, and therefore a heavy load is placed on the power transmission belt. As can be seen from these circumstances, the emphasis for the role of the one-way clutch is laid on absorbing, especially, low-frequency slight variations in angular velocity of the crank shaft within the low engine speed range.

Now, description will be made about the structure of a conventional one-way clutch disposed in the torque transmission path. As shown in FIG. 5, this one-way clutch includes an inner ring a, an outer ring b, and sprags c, c, ... each disposed between the inner and outer rings a, b for rocking motion in a plane orthogonal to an axis of rotation of the inner and outer rings a, b. Each of the sprags c tilts in a direction to wedge between the inner and outer rings a, b (clockwise direction in FIG. 5) to transmit torque therebetween, and tilts in a direction to come into sliding contact with the inner and outer rings a, b (counter-clockwise direction in FIG. 5) to cut off transmission of torque between the inner and outer rings a, b. The sprags c, c, ... are each normally urged to tilt in the above wedging direction while being guided slidably on each corresponding riding land f of a cage e by a pressing force F1 of each corresponding leaf spring d.

More specifically, in the plane where the sprag c rocks, a contact point Q at which the sprag C contacts the corresponding riding land f is positioned closer to the outer periphery of the clutch than a line (dot-dash line in FIG. 5) extending from a pressing point P, at which the sprag c takes a pressing force F1 of the leaf spring d, along the direction of the pressing force F1. Thus, the pressing force F1 is converted into a tilting force F2 that acts tangentially on the contact point Q of the sprag c to tilt the sprag c in the wedging direction.

In the above configuration, for example, when torque of the crank shaft is input to the outer ring b, for the period of increase in angular velocity of the crank shaft during slight variations in angular velocity thereof, each sprag c tilts in the wedging direction while shifting its contact point Q with rising land f toward the outer ring b by relative rotation of the outer ring b in a locking direction together with a pressing force F1 from the leaf spring d, thereby transmitting torque between the inner and outer rings a, b. On the other hand, for the period of decrease in angular velocity of the crank shaft during slight variations in angular velocity thereof, each sprag c tilts in the direction to slidingly contact the inner and outer rings a, b while shifting the contact point Q toward the inner ring a against the pressing force F1 of the leaf spring d by relative rotation of the outer ring b in an unlocking direction, thereby cutting off transmission of torque between the inner and outer rings a, b.

However, the above-mentioned conventional one-way clutch has the following problems. First, this one-way clutch readily causes a locking failure due to high-frequency (e.g., 160-Hz) slight variations in angular velocity within the high engine speed range. The reason for this seems as follows: When the sprag c tilts in the direction to slidingly contact the inner and outer rings a, b by relative rotation of the outer ring b in its unlocking direction, the sprag c wedges between the leaf spring d and the riding land f to produce a frictional force between the sprag c and the riding land f. This frictional force suppresses the tilting motion of the sprag c in the direction of wedging between the inner and outer rings a, b at the time of relative rotation of the outer ring b in its locking direction. This readily causes the above-mentioned locking failure in association with a deteriorated ability of the sprag c to follow slight variations in angular velocity as the engine speed increases.

Second, in the conventional one-way clutch, each sprag c cannot sufficiently follow high-frequency (e.g., 160-through 170-Hz) slight variations in angular velocity within the high engine speed range. Therefore, slips readily occur between each sprag c and respective inner and outer rings a, b. More specifically, the slight variations in angular velocity cause each sprag c to produce vibrations that may be accompanied with slips over the inner and outer rings a, b. This makes it inadequate for each sprag c to tilt in the direction to wedge between the inner and outer rings a, b for the period of increase in angular velocity during slight variations in angular velocity.

To cope with this, it can be considered that the pressing force F1 against each sprag c is increased by increasing the thickness of each leaf spring d so that vibrations of each sprag c are suppressed so as to securely tilt the sprag c in the wedging direction.

However, if the thickness of the leaf spring d is increased, a stress generated in the leaf spring d is also increased correspondingly. This results in another problem that the leaf spring d may readily be broken. Accordingly, in actuality, it is difficult to increase a pressing force F1 of each leaf spring d.

A first object of the present invention is to avoid a one-way clutch, disposed in a torque transmission path for transmitting torque accompanied with slight variations in angular velocity, from causing a locking failure for the period of increase in angular velocity during slight variations in angular velocity within the high engine speed range of a vehicle engine or the like by allowing each sprag to tilt in the wedging direction regardless of a frictional force between the sprag and a corresponding riding land.

A second object of the present invention is to improve the ability of each sprag, guided on a corresponding riding land of a cage in the same one-way clutch, to follow increase in angular velocity during high-frequency slight variations in angular velocity within the high engine speed range by enabling increase in a force that tilts the sprag in a direction of wedging between inner and outer rings without the necessity for increasing a pressing force of a pressing mechanism such as a leaf spring that normally urges the sprag into tilting motion in the wedging direction.

SUMMARY OF THE INVENTION

To attain the above first object, in the present invention, a contact point of each sprag at which it contacts a corresponding riding land of a cage in a plane where the sprag rocks is positioned closer to the outer ring than that of the conventional one-way clutch so that a tilting force acting on the contact point is larger than a frictional force between the sprag and the riding land acting on the contact point.

More specifically, the present invention is directed to a one-way clutch including: an inner ring; an outer ring relatively rotatably assembled with the inner ring; a plurality of sprags that are each disposed between the inner and outer rings for rocking motion in a plane orthogonal to an axis of rotation of the inner and outer rings, tilt in a direction to wedge between the inner and outer rings to transmit torque therebetween, and tilt in a direction to slidingly contact the inner and outer rings to cut off transmission of torque therebetween; a ring-like cage that is disposed coaxially between the inner and outer rings and has a plurality of riding lands, arranged in a direction orthogonal to the plane where the respective sprags rock, on which the respective sprags during rocking motion are slidably guided; and a plurality of pressing members for normally pressing the respective sprags so that the sprags tilt in the direction to wedge between the inner and outer rings while shifting contact points at which the sprags contact the riding lands of the cage in the plane where the sprags rock.

In addition, a tangential tilting force F2 acting on the contact point of each of the sprags with the riding land to tilt the sprag in the direction to wedge the sprag between the inner and outer rings is set larger than a frictional force F3 between the sprag and the riding land acting on the contact point (F2>F3).

According to this invention, when torque accompanied with slight variations in angular velocity is input to the one-way clutch, each sprag rocks while being slidably guided on the corresponding riding land of the cage to establish or disestablish transmission of torque between the inner and outer rings depending upon the slight variations in angular velocity. In detail, for the period of increase in angular velocity during slight variations in angular velocity, each sprag tilts in the direction to wedge between the inner and outer rings while shifting its contact point with the riding land of the cage by a pressing force of the pressing member and relative rotation of the inner and outer rings in their locking direction to transmit torque between the inner and outer rings. On the other hand, for the period of decrease in angular velocity during slight variations in angular velocity, each sprag tilts in the direction to slidingly contact the inner and outer rings while shifting its contact point with the riding land against the pressing force of the pressing member by relative rotation of the inner and outer rings in their unlocking direction to cut off transmission of torque therebetween. This tilting motion of the sprag in the direction to slidingly contact the rings results in wedging thereof between the riding land and the pressing member. Therefore, when the inner and outer rings relatively rotate in their locking direction for the next period of increase in angular velocity, the tilting motion of the sprag in the above wedging direction may be suppressed by a frictional force F3 between the sprag and the riding land which acts on the contact point of the sprag with the riding land.

At the time, however, a tangential tilting force F2, which tends to tilt the sprag in the wedging direction through the application of a pressing force from the pressing member, acts on the contact point of the sprag, and this tilting force F2 is larger than the frictional force F3 (F2>F3). Accordingly, the sprag, having wedged between the riding land of the cage and the pressing member for the period of decrease in angular velocity during slight variations in angular velocity, can tilt in the direction to wedge between the inner and outer rings against the frictional force F3 between the sprag and the riding land for the next period of increase in angular velocity.

The sprags are preferably made of steel, and at least the riding lands of the cage are preferably made of resin. Further, as shown in FIG. 1, when each of the pressing members 6 is arranged to normally press the corresponding sprag 5 in a direction orthogonal to the corresponding riding land 8, a sprag support angle θ that in the plane where the sprags 5 rock, a reference line L1 extending from a pressing point P1 where each of the sprags 5 takes a pressing force F1 of the pressing member 6 in the direction orthogonal to the corresponding riding land 8 makes with a line M containing the pressing point P1 and the contact point Q is preferably set at 12° or more.

With this arrangement, the tangential force (tilting force) F2, acting on the contact point Q of the sprag 5 with the riding land 8 to tilt the sprag 5 in the direction to wedge between the inner and outer rings 1, 2 (clockwise direction in FIG. 1), is represented by F2=F1×tan θ.

Meanwhile, if the coefficient of friction between the sprag 5 and the riding land 8 is $\mu$, the frictional force F3, acting on the contact point Q of the sprag 5 by the pressing force F1 of the pressing member 6, is represented by F3=F2×$\mu$. Accordingly, the requirement for establishment of F2>F3 is tan θ>$\mu$ (θ>tan$^{-1}$$\mu$). In other words, if tan θ>$\mu$, F2>F3 can be established regardless of the magnitude of the pressing force F1 of the pressing member 6.

In addition, the coefficient of friction $\mu$ between steel and resin is generally 0.1 through 0.2 (tan$^{-1}$$\mu$=5.7105 . . . through 11.3099 . . . ). And, the sprag support angle θ is 12° or more (>11.3099 . . . tan$^{-1}$$\mu$), which is larger than tan$^{-1}$$\mu$. Accordingly, the above requirement of tan θ>$\mu$ (θ>tan$^{-1}$$\mu$) is satisfied. As a result, specific operations and effects of the present invention can be attained.

The one-way clutch may be disposed in a torque transmission path for transmitting torque of a crank shaft rotating together with slight variations in angular velocity by an explosion stroke of a vehicle engine to an input shaft of auxiliary equipment through a power transmission belt. In this case, the following operation and effect can be attained. As described above, the tilting force in the wedging direction acting on the contact point of the sprag is larger than the frictional force between the sprag and the riding land acting on the contact point. Accordingly, when torque accompanied with slight variations in angular velocity is applied from the crank shaft of the vehicle engine to the one-way clutch, a locking failure of the one-way clutch can be eliminated which may cause for the period of increase in angular velocity during high-frequency slight variations in angular velocity within the high engine speed range.

To attain the above second object, in the present invention, a force that tilts the sprag in the direction to wedge it between the inner and outer rings is increased by using a centrifugal force accompanied with rotation of the inner and outer rings.

Specifically, the present invention is directed to a one-way clutch including: an inner ring; an outer ring relatively rotatably assembled with the inner ring; a plurality of sprags that are each disposed between the inner and outer rings for rocking motion in a plane orthogonal to an axis of rotation of the inner and outer rings, tilt in a direction to wedge between the inner and outer rings to transmit torque therebetween, and tilt in a direction to slidingly contact the inner and outer rings to cut off transmission of torque therebetween; and a plurality of pressing mechanisms for normally pressing the respective sprags so that the sprags tilt in the direction to wedge between the inner and outer rings.

In addition, the center of gravity of each of the sprags in the plane where the sprags rock is set at a position to allow the sprag to be tilted in the direction to wedge between the inner and outer rings by a centrifugal force accompanied with rotation of the inner and outer rings.

As already described, when a one-way clutch is disposed in a torque transmission path for transmitting torque accompanied with slight variations in angular velocity and relatively high-speed torque is input to the one-way clutch, if the pressing force of the pressing mechanism is inadequate, each of the sprags does not sufficiently tilt in the direction to wedge between the inner and outer rings at the relative rotation of the inner and outer rings in their locking direction for the period of increase in angular velocity during slight variations in angular velocity. This causes slips between the sprag and the respective inner and outer rings, which makes it difficult to transmit torque between the inner and outer rings through the sprags.

In the present invention, however, since the center of gravity of each sprag in the plane where the sprags rock exists at a position that allows the sprag to be tilted in the direction to wedge between the inner and outer rings by a centrifugal force accompanied with rotation of the inner and outer rings, each sprag takes not only a pressing force of the corresponding pressing mechanism but also a tilting force in the wedging direction based on the centrifugal force. Actions of both the forces increase a force that tilts the sprag in the wedging direction to suppress vibrations of the sprag, even when the input torque is accompanied with such relatively high-frequency slight variations in angular velocity as generated within the high engine speed range of a vehicle engine. Accordingly, the ability of the sprag to follow increase in angular velocity during slight variations in angular velocity can readily be improved.

The center of gravity of each of the sprags in the plane where the sprags rock is preferably set at a position on the side where the centrifugal force accompanied with rotation of the inner and outer rings allows the sprag to be tilted in the direction to wedge between the inner and outer rings with respect to a reference line containing the center of rotation of the inner and outer rings and a sliding contact point at which the sprag slidingly contacts the outer ring in the plane where the sprag rocks during the cut-off of transmission of torque.

With this configuration, when the inner and outer rings relatively rotate in their unlocking direction, each of the sprags tilt in the direction to slidingly contact the inner and outer rings thereby cutting off transmission of torque between the inner and outer rings. Then, when the relative rotation of the inner and outer rings turns to their locking direction, a tilting force in the direction to wedge each of the sprags between the inner and outer rings is always provided by a centrifugal force accompanied with the rotation of the inner and outer rings, since the center of gravity of the sprag exists at a position on the side where the centrifugal force accompanied with rotation of the inner and outer rings allows the sprag to be tilted in the direction to wedge between the inner and outer rings with respect to the reference line containing the center of rotation of the inner and outer rings and the sliding contact point of the sprag with the outer ring during the cut-off of transmission of torque.

The above one-way clutch may be disposed in a torque transmission path for transmitting torque of a crank shaft rotating together with slight variations in angular velocity by an explosion stroke of a vehicle engine to an input shaft of auxiliary equipment through a power transmission belt.

With this configuration, when torque accompanied with slight variations in angular velocity is input from the crank shaft of the vehicle engine to the one-way clutch, for the period of increase in angular velocity during the slight variations in angular velocity of the crank shaft, the inner and outer rings relatively rotate in their locking direction so that each of the sprags tilts in the direction to wedge between the inner and outer rings. On the other hand, for the period of decrease in angular velocity, the inner and outer rings relatively rotate in their unlocking direction so that each of the sprags tilts in the direction to slidingly contact the inner and outer rings. Further, since each of the sprags normally takes a tilting force in the wedging direction based on the centrifugal force accompanied with rotation of the inner and outer rings as well as the pressing force of the pressing mechanism, vibrations of the sprag due to an inadequate pressing force of the pressing mechanism can be suppressed during high-frequency slight variations in angular velocity within the high engine speed range. This improves the ability of the sprag to follow increase in angular velocity during slight variations in angular velocity.

A pulley for training the power transmission belt therearound may be provided around the outer periphery of the outer ring. In this case, the pulley forms a pulley with a built-in one-way clutch. When this pulley with a built-in one-way clutch is mounted on an input shaft of auxiliary equipment or the like, a torque transmission path is formed between the crank shaft of the engine and the input shaft of the auxiliary equipment through the power transmission belt.

DESCRIPTION OF THE PREFERRED EMBODIMENTS (Embodiment 1)

Figure 3:
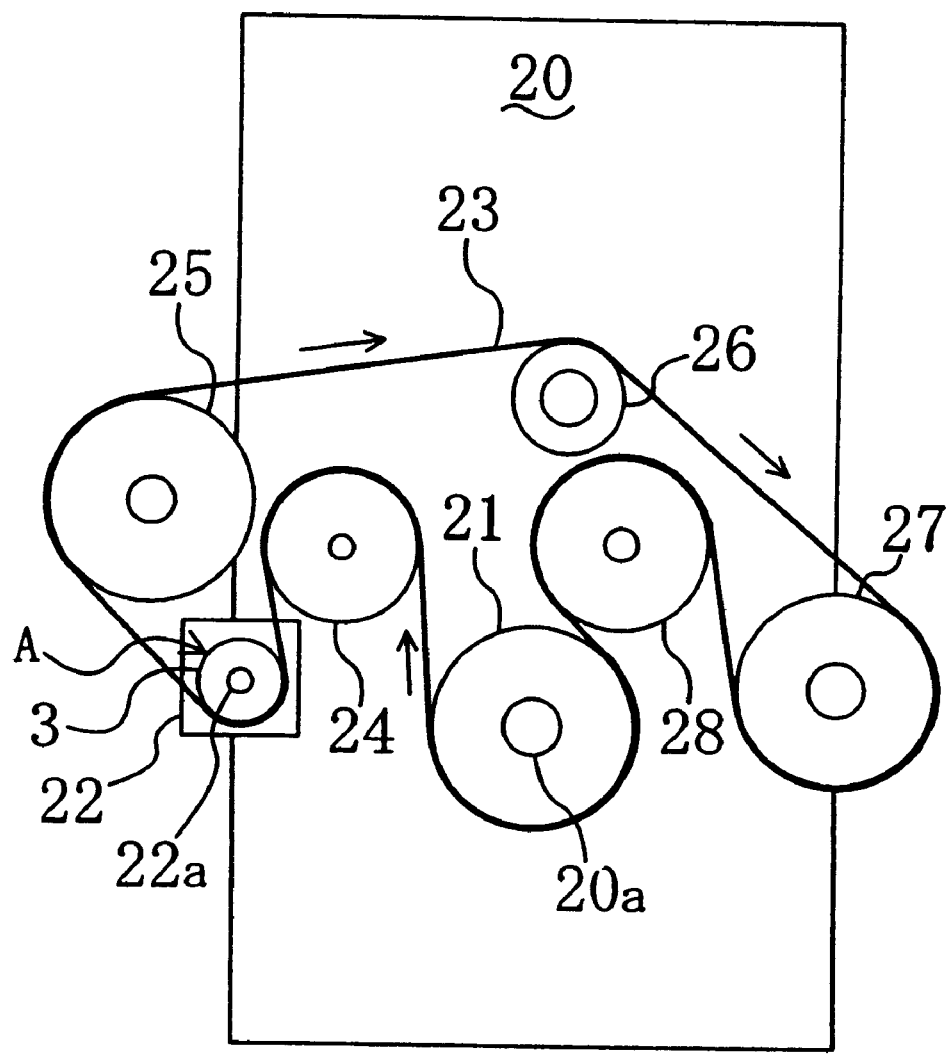
FIG. 3 is a schematic diagram showing a serpentine drive type auxiliary equipment driving apparatus for vehicle engines.

FIG. 3 schematically shows the layout of a belt-driven type auxiliary equipment driving apparatus for vehicle engines in which a pulley A with a built-in one-way clutch according to Embodiment 1 of the present invention is disposed. This auxiliary equipment driving apparatus is disposed at one end of a four-cylinder four-stroke-cycle engine 20 mounted on an automotive vehicle. In detail, the auxiliary equipment driving apparatus includes a drive pulley 21 mounted on a crank shaft 20a rotating together with slight variations in angular velocity due to an explosion stroke of the engine 20, and a plurality of driven pulleys mounted on input shafts of a plurality of auxiliary machines including an alternator 22, respectively. A single V-ribbed belt 23 as a power transmission belt is trained, in a serpentine form or in a so-called serpentine layout, around these pulleys.

More specifically, the drive pulley 21, a tension pulley 24 of an automatic belt tensioner, a pulley 25 for a hydraulic pump of a power steering, an idler pulley 26, a pulley 27 for a compressor of an air conditioner, and a pulley 28 for an engine-cooling fan are arranged in the order of a running direction of the V-ribbed belt 23 shown in arrows in FIG. 3. In addition, the pulley A with a built-in one-way clutch is disposed between the tension pulley 24 and the pulley 25 for a hydraulic pump, and is mounted on an alternator shaft 22a of the alternator 22 with a rotor having relatively large inertial torque.

Figure 1:
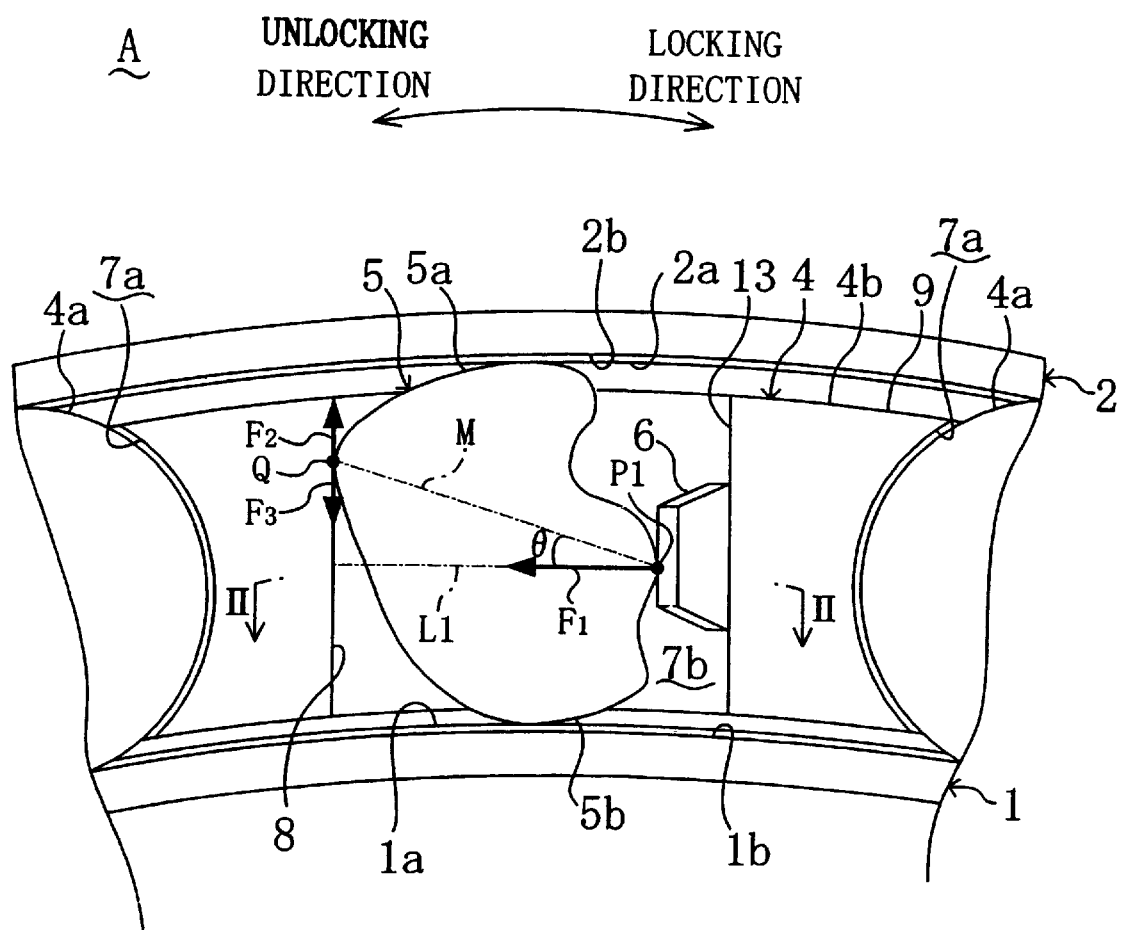
FIG. 1 is an enlarged side view showing an essential part of a pulley with a built-in one-way clutch according to Embodiment 1 of the present invention.
Figure 2:
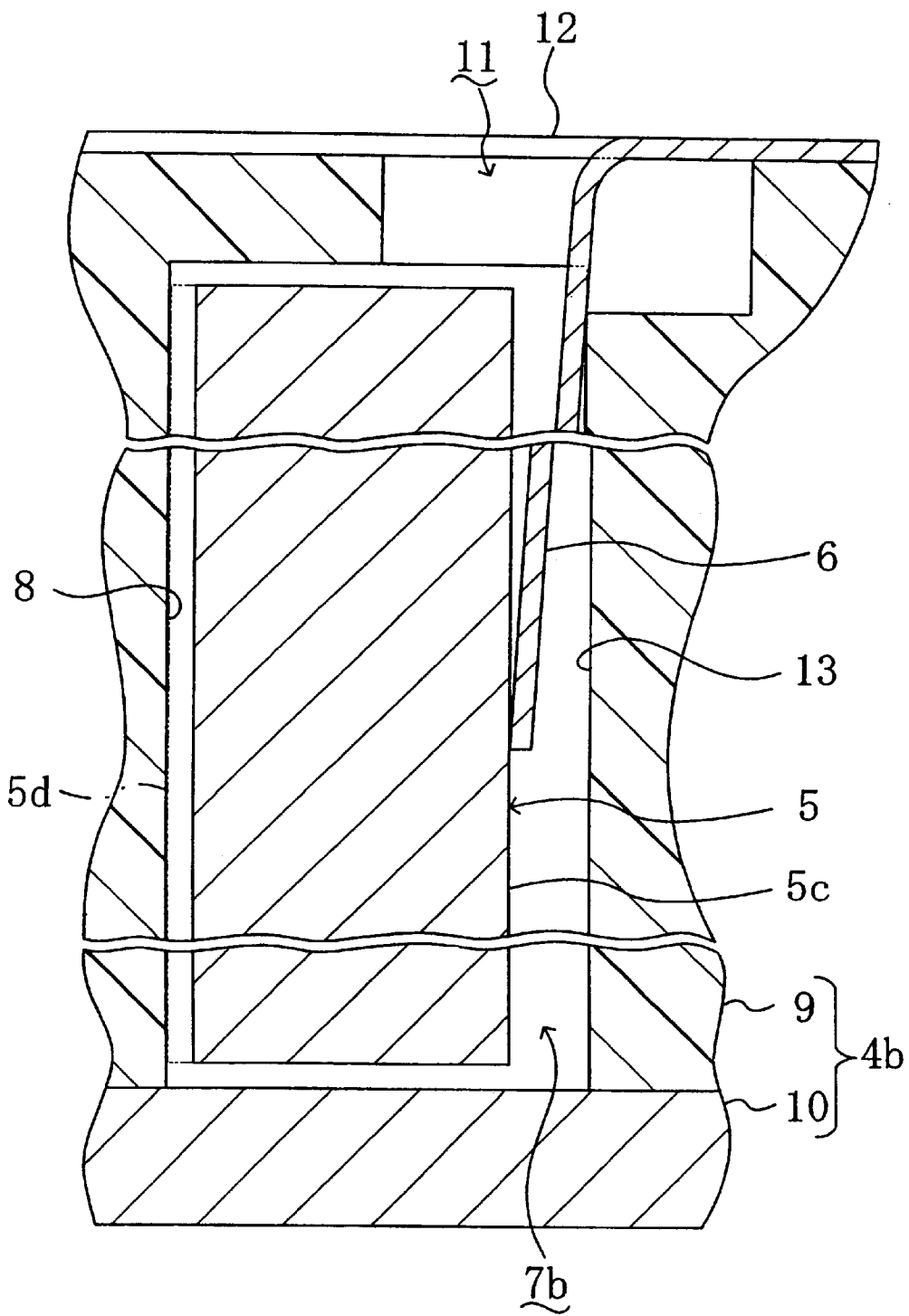
FIG. 2 is a cross-sectional view taken along the line II—II of FIG. 1.

As shown in FIGS. 1 and 2, the pulley A with a built-in one-way clutch includes: an inner ring 1 mounted for unitary rotation on the alternator shaft 22a; an outer ring 2 assembled for relative rotation with the inner ring 1 and provided for unitary rotation with a pulley 3 for training the V-ribbed belt 23 therearound; a single row bearing 4 as a deep groove ball bearing having steel balls 4a, 4a . . . arranged between the inner and outer rings 1, 2 in a single plane orthogonal to the axis of rotation of these rings 1, 2 and a ring-like cage 4b for retaining the steel balls 4a, 4a, . . . to roll them therein; a plurality of sprags 5, 5, . . . which are each disposed for rocking motion between the inner and outer rings 1, 2 in the plane orthogonal to the axis of rotation, tilt in a direction to wedge between the inner and outer rings 1, 2 (clockwise direction in FIG. 1) to transmit torque therebetween, and tilt in a direction to slidingly contact the inner and outer rings 1, 2 (counter-clockwise direction in FIG. 1) to cut off transmission of torque therebetween; and a plurality of leaf springs 6, 6, . . . as pressing mechanisms for normally pressing the respective sprags 5, 5, . . . to allow the sprags to tilt in the direction to wedge between the inner and outer rings 1, 2.

In the cage 4b of the single row bearing 4, a plurality of ball retaining holes 7a, 7a, . . . of circular cross section cut through the cage 4b in its radial direction and a plurality of sprag retaining holes 7b, 7b, . . . of rectangular cross section cut through the cage 4b in its radial direction are arranged in a given pattern (e.g., alternately) at predetermined circumferential pitches. The former retaining holes 7a, 7a, . . . accommodate respective steel balls 4a, 4a, . . . , while the latter retaining holes 7b, 7b, . . . accommodate respective sprags 5, 5, . . . Accordingly, the steel balls 4a, 4a, . . . and the sprags 5, 5, . . . of the single row bearing 4 are arranged in the same plane. In addition, the outer periphery 1a of the inner ring 1 and the inner periphery 2a of the outer ring 2 are formed with deep grooves 1b, 2b of arcuate cross section for guiding the steel balls 4a, 4a, . . . to allow for their rolling motion, respectively.

Out of a pair of inner wall surfaces of the sprag retaining hole 7b opposed to each other in the circumferential direction, the inner wall surface on the left-hand side in FIGS. 1 and 2 serves as a riding land 8 on which the sprag 5 during rocking motion is slidably guided. The cage 4b is composed of: a resin-made cage body 9 having a plurality of recesses each opening in one axial end surface of the cage body (the lower end surface thereof in FIG. 2) so as to form the inner walls of each sprag retaining hole 7b in three directions; and a supporting plate 10 bound on the one axial end surface of the cage body 9 so as to form the remaining inner wall surface of each sprag retaining hole 7b. In addition, the cage body 9 is provided with a reception hole 11 opening into both the sprag retaining hole 7b and the other axial end surface of the cage body 9 (the upper end surface thereof in FIG. 2).

Each of the leaf springs 6 is formed such that part of a single annular leaf spring member 12 bound on the other axial end surface of the cage body 9 is bent out toward the one axial end surface thereof. The leaf spring 6 is positioned to pass through the reception hole 11 and enter between the sprag 5 and an inner wall surface 13 of the sprag retaining hole 7b circumferentially opposed to the riding land 8 thereof. In this arrangement, the leaf spring 6 normally presses the sprag 5 against the riding land 8. The direction of a pressing force F1 of each leaf spring 6 is set to be orthogonal to the riding land 8. In addition, the leaf spring 6 is tapered to gradually decrease its width toward its distal end.

Each of the sprags 5 has contact surfaces, serving as cam surfaces 5a, 5b, respectively, on which it contacts the outer periphery 1a of the inner ring 1 and the inner periphery 2a of the outer ring 2, and thereby tilts responsively to relative rotation of the outer ring 2 with respect to the inner ring 1. Specifically, when the outer ring 2 relatively rotates in the locking direction for the period of increase in angular velocity during slight variations in angular velocity of the crank shaft 20a, each of the sprags 5 tilts in the direction to wedge between the inner and outer rings 1, 2 responsively to the relative rotation. On the other hand, when the outer ring 2 relatively rotates in the unlocking direction for the period of decrease in angular velocity, each of the sprags 5 tilts in the direction to slidingly contact the inner and outer rings 1, 2 responsively to the relative rotation.

A portion of the sprag 5 pressed by the leaf spring 6 is formed into an extending portion 5c extending toward the leaf ring 6. On the other hand, a portion of the sprag 5 pressed against the riding land 8 by the pressing force F1 of the leaf spring 6 is formed into a contact surface 5d of substantially arcuate cross section slidably contacting the riding land 8. The contact surface 5d is located closer to the outer ring 2 than the extending portion 5c. This allows the pressing force F1 of the leaf spring 6, taken by the sprag 5, to be converted into a tangential tilting force F2 acting on a contact point Q at which the sprag 5 contacts the corresponding riding land 8 in the plane where the sprag 5 rocks. This tilting force F2 causes the sprag 5 to be tilted in the direction to wedge between the inner and outer rings 1, 2 while moving its contact point Q with the riding land 8 toward the outer ring 2 along the riding land 8 during relative rotation of the outer ring 2 in the locking direction.

Further, in this embodiment, the tangential tilting force F2 acting on the contact point Q of the sprag 5 with the riding land 8 is set larger than a frictional force F3 between the sprag 5 and the riding land 8 acting on the contact point Q in the direction opposite to the tilting force F2 (i.e., F2>F3).

In detail, if the coefficient of friction $\mu$ between the sprag 5 and the riding land 8 of the cage 4 is 0.1 through 0.2, a sprag support angle θ that in the plane where the sprags 5 rock, a reference line L1 extending from a pressing point P1 where the sprag 5 takes the pressing force F1 of the leaf spring 6 in a direction of the pressing force F1 makes with a line M containing the pressing point P1 and the contact point Q is set at 12° or more.

Next, the operation of the pulley A with a built-in one-way clutch will be described. First, torque accompanied with slight variations in angular velocity is input from the crank shaft 20*a* of the vehicle engine 20 to the pulley A with a built-in one-way clutch through the V-ribbed belt 23 of the serpentine drive type auxiliary equipment driving apparatus. At the time, each sprag 5 of the pulley A with a built-in one-way clutch tilts while being guided slidably on the corresponding riding land 8 to establish or disestablish transmission of torque between the inner and outer rings 1, 2 responsively to the slight variations in angular velocity of the crank shaft 20*a*. Specifically, for the period of increase in angular velocity during slight variations in angular velocity of the crank shaft 20*a*, the sprag 5 is tilted in the direction to wedge between the inner and outer rings 1, 2 while moving its contact point Q with the riding land 8 toward the outer ring 2 by the pressing force F1 of the leaf spring 6 and relative rotation of the outer ring 2 in the locking direction, thereby transmitting torque between the inner and outer rings 1, 2.

On the other hand, for the period of decrease in angular velocity during the slight variations in angular velocity of the crank shaft 20*a*, the sprag 5 is tilted in the direction to slidingly contact the inner and outer rings 1, 2 while moving its contact point Q with the riding land 8 against the pressing force F1 of the leaf spring 6 by relative rotation of the outer ring 2 in the unlocking direction, thereby cutting off transmission of torque therebetween. This tilting motion of the sprag 5 in the direction to slidingly contact the rings 1, 2 results in wedging thereof between the riding land 8 and the leaf spring 6. Therefore, when the outer ring 2 relatively rotates in the locking direction for the next period of increase in angular velocity, the tilting motion of the sprag 5 in the direction to wedge between the rings 1, 2 may be suppressed by a frictional force F3 between the sprag 5 and the riding land 8 which acts on the contact point Q of the sprag 5 with the riding land 8.

At the time, however, a tangential tilting force F2, which tends to tilt the sprag 5 in the wedging direction through the application of the pressing force F1 from the leaf spring 6, acts on the contact point Q of the sprag 5, and this tilting force F2 is larger than the frictional force F3 (F2>F3). Accordingly, the sprag 5, having wedged between the riding land 8 of the cage 4 and the leaf spring 6 for the period of decrease in angular velocity during slight variations in angular velocity, can be tilted in the direction to wedge between the inner and outer rings 1, 2 against the frictional force F3 between the sprag 5 and the riding land 8 for the next period of increase in angular velocity.

As described above, in this embodiment, in mounting the pulley A with a built-in one-way clutch on the alternator shaft 22*a* of the alternator 22 to which torque of the crank shaft 20*a* rotating together with slight variations in angular velocity by the explosion stroke of the vehicle engine 20 is transmitted through the V-ribbed belt 23, the sprag support angle è in the pulley A with a built-in one-way clutch is set at 12° or more, and the tilting force F2 acting on the contact point Q of the sprag 5 is set larger than the frictional force F3 between the sprag 5 and the riding land 8 acting on the contact point Q in the direction opposite to the tilting force F2. This ensures that the sprag 5 is tilted in the direction to wedge between the inner and outer rings 1, 2 by relative rotation of the outer ring 2 in the locking direction. Accordingly, there can be effectively eliminated a locking failure that may occur for the period of increase in angular velocity during high-frequency (for example, 160 through 170 Hz at 5000 rpm) slight variations in angular velocity within the high engine speed range of the engine 20.

In Embodiment 1, the pressing force F1 on each sprag 5 is set to act in a direction orthogonal to the riding land 8. However, the present invention is also applicable to the case where the direction of the pressing force F1 is not orthogonal to the riding land 8.

(Embodiment 2)

Figure 4:
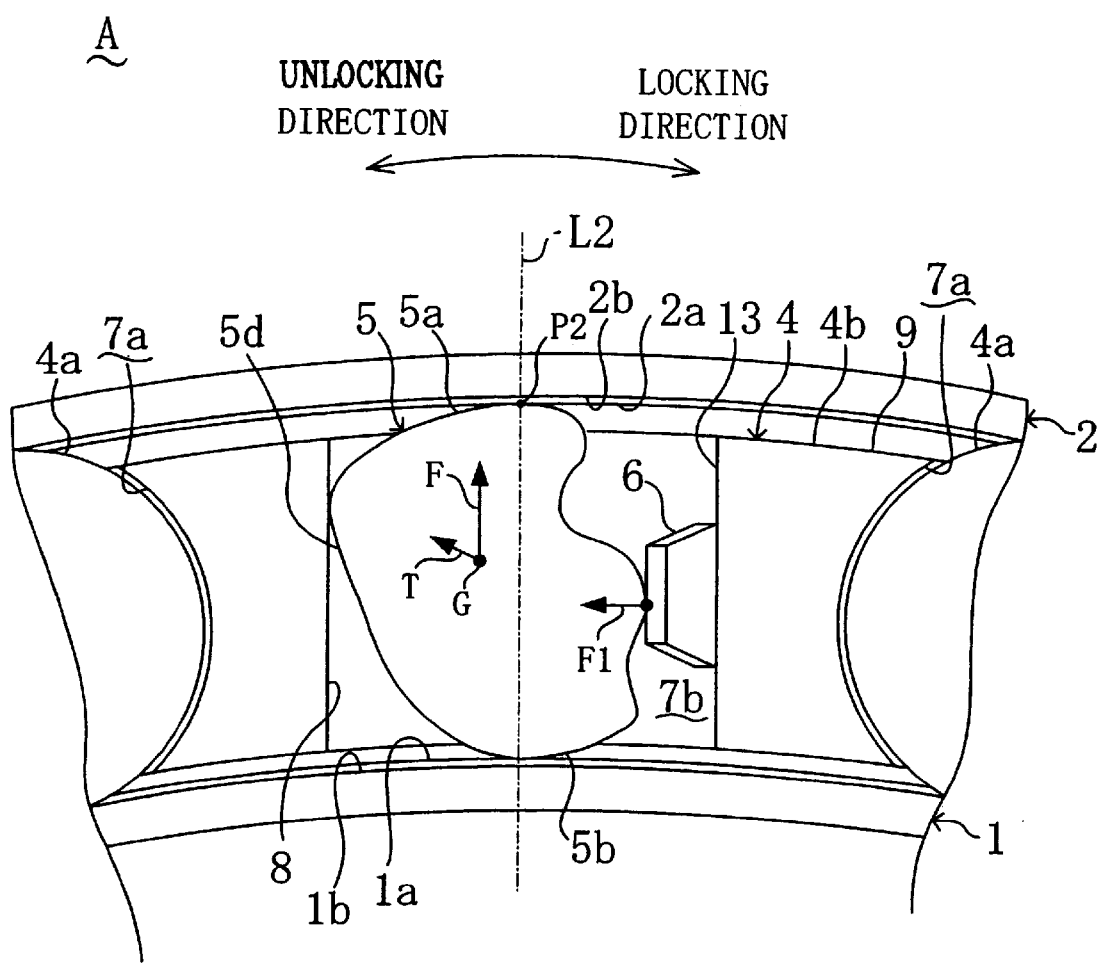
FIG. 4 is a corresponding view of FIG. 1 showing an essential part of a pulley with a built-in one-way clutch according to Embodiment 2 of the present invention.
Figure 5:
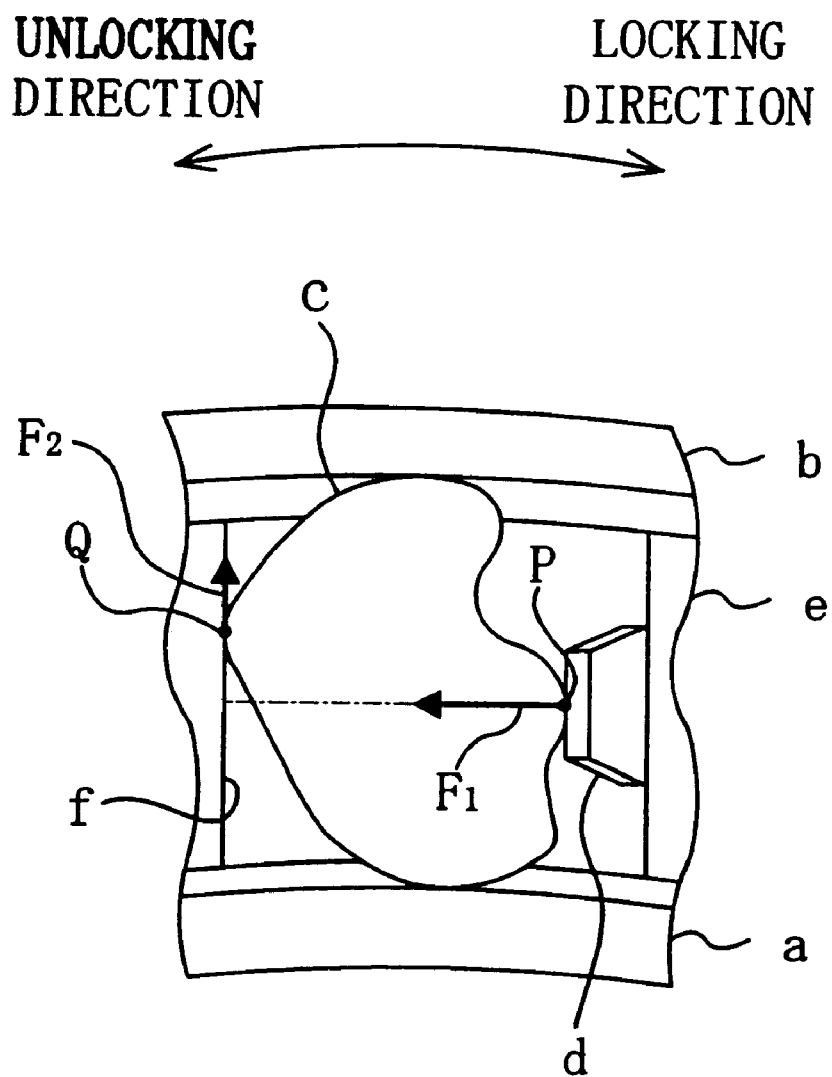
FIG. 5 is a corresponding view of FIG. 1 showing an essential part of a conventional one-way clutch.

FIG. 4 shows a pulley A with a built-in one-way clutch according to Embodiment 2 of the present invention, wherein like parts are identified by the same reference characters as in FIGS. 1 through 3 and a full description thereof will be omitted. In this embodiment, the center of gravity G of each sprag 5 of the pulley A with a built-in one-way clutch in the plane where the sprag 5 rocks is set at a position to allow the sprag 5 to be tilted in the direction to wedge between the inner and outer rings 1, 2 by a centrifugal force F accompanied with rotation of the outer ring 2.

More specifically, the center of gravity G is set at a position on the side where the centrifugal force accompanied with rotation of the inner and outer rings 1, 2 allows the sprag 5 to be tilted in the direction to wedge between the inner and outer rings 1, 2 (left-hand position in FIG. 4) with respect to a reference line L2 containing the center (not shown) of rotation of the inner and outer rings 1, 2 and a sliding contact point P2 at which the sprag 5 contacts the outer ring 2 in the plane where the sprag 5 rocks during the cut-off of transmission of torque.

In this embodiment, torque accompanied with slight variations in angular velocity is input from the crank shaft 20*a* of the vehicle engine 20 to the outer ring 2 of the pulley A with a built-in one-way clutch through the V-ribbed belt 23. At the time, since the center of gravity G of each sprag 5 exists at a position that allows the sprag 5 to be tilted in the direction to wedge between the inner and outer rings 1, 2 by the centrifugal force F accompanied with rotation of the inner and outer rings 1, 2, each sprag 5 always takes not only the pressing force F1 of the corresponding leaf spring 6 but also a tilting force T that tilts the sprag 5 in the direction to wedge it between the inner and outer rings 1, 2 due to the centrifugal force F.

As described above, in this embodiment, in mounting the pulley A with a built-in one-way clutch on the alternator shaft 22*a* of the alternator 22 to which torque of the crank shaft 20*a* rotating together with slight variations in angular velocity by the explosion stroke of the vehicle engine 20 is transmitted through the V-ribbed belt 23, the center of gravity G of each sprag 5 of the pulley A with a built-in one-way clutch is set at a position on the side where the centrifugal force F accompanied with rotation of the inner and outer rings 1, 2 allows the sprag 5 to be tilted in the direction to wedge between the inner and outer rings 1, 2 with respect to the reference line L2 containing the center of rotation of the inner and outer rings 1, 2 and the sliding contact point P2 of the sprag 5 with the outer ring 2 in the plane where the sprag 5 rocks during the cut-off of transmission of torque. Accordingly, the tilting force on the sprag 5 in its wedging direction can be increased regardless of the magnitude of the pressing force F1 of the leaf spring 6. This readily improves the ability of the sprag 5 to follow increase in angular velocity during high-frequency (for example, 160 through 170 Hz at 5000 rpm) slight variations in angular velocity within the high engine speed range of the engine 20.

In order to relatively rotatably assemble the inner ring 1 with the outer ring 2, the foregoing embodiments each employ one single row bearing 4 formed of a deep groove ball spring in which the steel balls 4a, 4a, . . . are arranged in the same plane where the sprags 5, 5, . . . arearranged. However, the present invention can employ various bearings of other types, and imposes no special limitations upon axial arrangement of the bearing and the number of bearings.

In the foregoing embodiments, the pressing members for pressing the sprags 5, 5, . . . are formed of leaf springs 6, 6, . . . respectively. However, pressing members known in the art other than the leaf springs 6, 6, . . . can adequately be employed.

Further, the foregoing embodiments each describe the pulley A with a built-in one-way clutch in which the pulley 3 is disposed around the outer periphery of the outer ring 2. However, the present invention can be applied to any one-way clutch in which sprags 5, 5, . . . rock in a plane orthogonal to the axis of rotation of inner and outer rings 1, 2 to establish or disestablish transmission of torque between the inner and outer rings 1, 2.

What is claimed is:

1. A one-way clutch comprising:

an inner ring;

an outer ring relatively rotatably assembled with the inner ring;

a plurality of sprags that are each disposed between the inner and outer rings for rocking motion in a plane orthogonal to an axis of rotation of the inner and outer rings, tilt in a direction to wedge between the inner and outer rings to transmit torque therebetween, and tilt in a direction to slidingly contact the inner and outer rings to cut off transmission of torque therebetween;

a ring-like cage that is disposed coaxially between the inner and outer rings and has a plurality of riding lands, arranged in a direction orthogonal to the plane where the respective sprags rock, on which the respective sprags during rocking motion are slidably guided; and a plurality of pressing members for normally pressing the respective sprags so that the sprags tilt in the direction to wedge between the inner and outer rings while shifting contact points at which the sprags contact the riding lands of the cage in the plane where the sprags rock, wherein a tangential tilting force acting on the contact point of each of the sprags with the riding land to tilt the sprag in the direction to wedge the sprag between the inner and outer rings is set larger than a frictional force between the sprag and the riding land acting on the contact point.

2. The one-way clutch of claim 1, wherein the sprags are made of steel, at least the riding lands of the cage are made of resin, each of the pressing members is arranged to normally press the corresponding sprag in a direction orthogonal to the corresponding riding land, and a sprag support angle that in the plane where the sprags rock, a reference line extending from a pressing point where each of the sprags takes a pressing force of the pressing member in the direction orthogonal to the corresponding riding land makes with a line containing the pressing point and the contact point of the sprag is set at 12° or more.

3. The one-way clutch of claim 1 or 2, wherein the one-way clutch is disposed in a torque transmission path for transmitting torque of a crank shaft rotating together with slight variations in angular velocity by an explosion stroke of a vehicle engine to an input shaft of auxiliary equipment through a power transmission belt.

4. The one-way clutch of claim 3, wherein a pulley for training the power transmission belt therearound is provided around the outer periphery of the outer ring.

* * * * *